United States Patent
Takizawa et al.

(10) Patent No.: US 10,552,043 B2
(45) Date of Patent: Feb. 4, 2020

(54) MEMORY SYSTEM

(71) Applicant: Toshiba Memory Corporation, Minato-ku, Tokyo (JP)

(72) Inventors: Kazutaka Takizawa, Kawasaki Kanagawa (JP); Masaaki Niijima, Machida Tokyo (JP)

(73) Assignee: Toshiba Memory Corporation, Tokyo (JP)

( * ) Notice: Subject to any disclaimer, the term of this patent is extended or adjusted under 35 U.S.C. 154(b) by 740 days.

(21) Appl. No.: 14/644,106

(22) Filed: Mar. 10, 2015

(65) Prior Publication Data

US 2016/0070472 A1 Mar. 10, 2016

Related U.S. Application Data (60) Provisional application No. 62/047,812, filed on Sep. 9, 2014.

(51) Int. Cl.
*G06F 3/06* (2006.01)

(52) U.S. Cl.
CPC ............ *G06F 3/061* (2013.01); *G06F 3/0688* (2013.01)

(58) Field of Classification Search
CPC ...... G06F 3/0679; G06F 3/061; G06F 3/0653; G06F 3/0659; G06F 2212/2022; G06F 12/0238; G06F 2201/81; G06F 2212/202; G06F 11/3058; G06F 11/3065

See application file for complete search history.

(56) References Cited

U.S. PATENT DOCUMENTS

| | | | | |
|---|---|---|---|---|
| 5,832,515 A | * | 11/1998 | Ledain | .................. G06F 3/0619 |
| 5,996,054 A | * | 11/1999 | Ledain | .............. G06F 17/30144 |
| | | | | 711/112 |
| 6,021,408 A | * | 2/2000 | Ledain | .............. G06F 17/30067 |
| | | | | 707/823 |
| 6,094,368 A | * | 7/2000 | Ching | ................. G06F 12/1408 |
| | | | | 365/185.03 |
| 6,381,670 B1 | * | 4/2002 | Lee | ......................... G11C 8/10 |
| | | | | 365/104 |

(Continued)

FOREIGN PATENT DOCUMENTS

| | | |
|---|---|---|
| JP | 2007-87464 | 4/2007 |
| JP | 2013-25821 | 2/2013 |

*Primary Examiner* — Ryan Bertram
*Assistant Examiner* — Alex G Olson
(74) *Attorney, Agent, or Firm* — White & Case LLP (57) ABSTRACT

According to one embodiment, a memory system comprises a non-volatile semiconductor memory, a memory and a controller. The memory stores a management table including a plurality of parameters for managing the non-volatile semiconductor memory. The controller is configured to control the operation of the non-volatile semiconductor memory based on a first value of the parameters contained in the management table. The controller obtains a second value corresponding to the parameters from an operation log of the non-volatile semiconductor memory, compares the second value of the parameters with the first value, calculates the difference between the second value of the parameters and the first value when they are different from each other, calculates a correction value for correcting the first value when the difference is greater than a third value, and updates the first value of the management table based on the correction value.

21 Claims, 8 Drawing Sheets

(56) References Cited

U.S. PATENT DOCUMENTS

| | | | |
|---|---|---|---|
| 7,496,811 B2* | 2/2009 | Kanno | G11B 20/18 360/48 |
| 9,396,792 B2* | 7/2016 | Wu | G11C 11/5642 |
| 2002/0039312 A1* | 4/2002 | Nomura | G11C 16/3454 365/185.11 |
| 2003/0037255 A1* | 2/2003 | Yoshino | G01D 9/005 705/51 |
| 2005/0223164 A1* | 10/2005 | Kitamura | G06F 21/10 711/112 |
| 2006/0059322 A1* | 3/2006 | Poston | G06F 11/1471 711/162 |
| 2006/0195297 A1* | 8/2006 | Kubota | G06F 17/30861 702/187 |
| 2006/0259615 A1* | 11/2006 | Beniya | H04N 21/4131 709/224 |
| 2007/0006302 A1* | 1/2007 | Donnelly | G06F 21/31 726/22 |
| 2007/0006303 A1* | 1/2007 | Donnelly | G06F 21/57 726/22 |
| 2009/0077429 A1* | 3/2009 | Yim | G06F 12/0246 714/54 |
| 2009/0204618 A1* | 8/2009 | Tanaka | G06F 11/3476 |
| 2009/0300374 A1* | 12/2009 | Mori | G06F 1/3203 713/300 |
| 2010/0093401 A1* | 4/2010 | Moran | G06F 1/1626 455/566 |
| 2010/0103731 A1* | 4/2010 | Yoo | G11C 16/26 365/185.02 |
| 2010/0235715 A1* | 9/2010 | Thatcher | G11C 16/10 714/763 |
| 2012/0191645 A1* | 7/2012 | Koike | G06F 17/30377 707/610 |
| 2012/0198129 A1* | 8/2012 | Van Aken | G06F 12/0246 711/103 |
| 2012/0200883 A1* | 8/2012 | Ikari | G03G 15/5004 358/1.15 |
| 2012/0226959 A1* | 9/2012 | Xie | G06F 11/1048 714/763 |
| 2012/0254699 A1* | 10/2012 | Ruby | G06F 11/1048 714/773 |
| 2013/0102362 A1* | 4/2013 | Inagaki | H03G 9/025 455/563 |
| 2013/0132652 A1* | 5/2013 | Wood | G06F 12/0246 711/103 |
| 2013/0148435 A1* | 6/2013 | Matsunaga | G11C 16/3404 365/185.23 |
| 2013/0238836 A1* | 9/2013 | Suzuki | G11C 16/3431 711/103 |
| 2014/0281119 A1* | 9/2014 | Hyun | G06F 12/0238 711/102 |
| 2015/0170716 A1* | 6/2015 | Lucas | G11C 5/147 365/226 |
| 2015/0186055 A1* | 7/2015 | Darragh | G06F 3/0616 711/103 |
| 2015/0186072 A1* | 7/2015 | Darragh | G06F 3/0653 711/103 |
| 2016/0062656 A1* | 3/2016 | Ramaraju | G11C 16/10 711/103 |

* cited by examiner

| Number of writes | Surface temperature of substrate | Access frequency | Access speed | Program voltage |
|---|---|---|---|---|
| N1 | T1 | F1 | V1 | VT1 |
| N2 | T2 | F2 | V2 | VT2 |
| N3 | T3 | F3 | V3 | VT3 |
| .... | .... | .... | .... | .... |

MEMORY SYSTEM

CROSS-REFERENCE TO RELATED APPLICATIONS

This application claims the benefit of U.S. Provisional Application No. 62/047,812, filed Sep. 9, 2014, the entire contents of which are incorporated herein by reference.

FIELD

Embodiments described herein relate generally to a memory system using, for example, a non-volatile semiconductor memory.

BACKGROUND

Memory systems using a non-volatile semiconductor memory such as a solid-state drive (SSD) have been developed. These memory systems comprise an operation management table for operating a NAND flash memory installed in an SSD. The operation management table contains various parameters such as a voltage and the number of erases set in advance for operating the NAND flash memory properly, and the NAND flash memory operates based on theses parameters.

DETAILED DESCRIPTION

In general, according to one embodiment, a memory system comprises a non-volatile semiconductor memory, a memory and a controller. The memory stores a management table including a plurality of parameters for managing the non-volatile semiconductor memory. The controller is configured to control the operation of the non-volatile semiconductor memory based on a first value of the parameters contained in the management table. The controller obtains a second value corresponding to the parameters from an operation log of the non-volatile semiconductor memory, compares the second value with the first value, calculates the difference between the second value and the first value when they are different from each other, calculates a correction value for correcting the first value when the difference is greater than a third value, and updates the first value of the management table based on the correction value.

As described above, NAND flash memories are operated on the basis of the parameters set in advance for each chip and contained in the operation management table, thereby being managed. The parameters include data of, for example, the number of writes, the temperature of the chip, the temperature of the substrate on which the chip is mounted, various voltages including the program voltage, and the like. It is known in NAND flash memories that the performance is degraded as the number of writes and the number of erases increase, but the values of the parameters contained in the operation management table are constant. Therefore, the value of each parameter of the operation management table is not always an optimum value for a degraded NAND flash memory. Consequently, the NAND flash memory cannot deliver a desired performance, which reduces the life of the NAND flash memory and of the computer, server, storage system and the like mounting it thereon.

Therefore, it is desired that the performance of a plurality of NAND packages be equalized and the life of the NAND package and of the device be sustained.

First Embodiment

The present embodiment will now be described with reference to accompanying drawings. In the drawings, portions identical to each other are designated by the same reference numbers, and detailed descriptions thereof are omitted.

Figure 1:
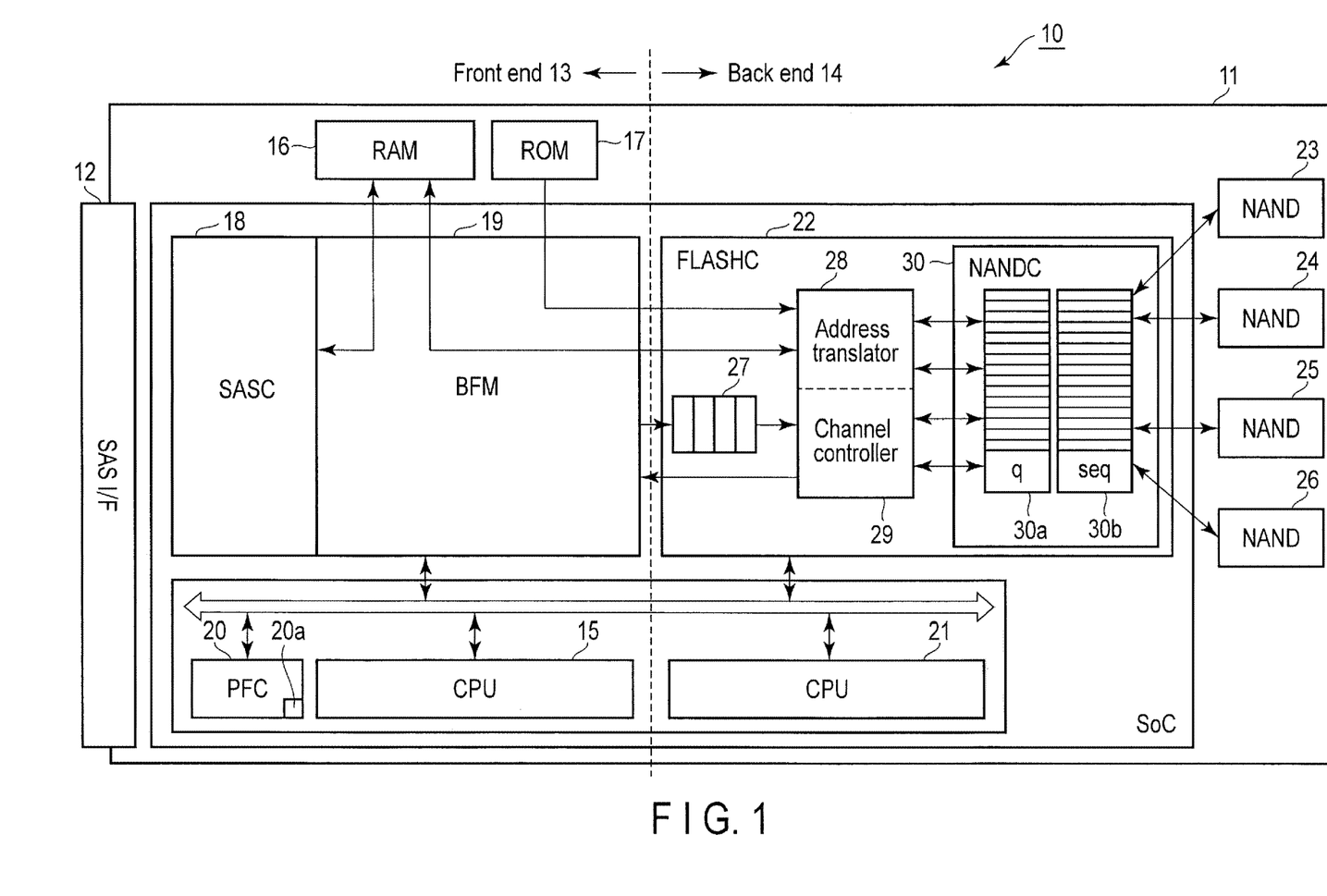
FIG. 1 is a schematic block diagram showing an example of a memory system to which the present embodiments are applied.

FIG. 1 shows an SSD module 10 as a storage module. The SSD module 10 comprises, for example, a serial attached SCSI (SAS) interface (SASI/F) 12, a front end 13 and a back end 14, which are provided on a substrate 11. The SSD module 10 is connected to a host controller (not shown) such as a server (hereinafter referred to as a host) via the SASI/F 12, and functions as an external memory.

The front end 13 transmits to and receives from a host a command and data via the SASI/F 12. The front end 13 includes a CPU 15, a DRAM 16 as a volatile memory, a ROM 17 as a non-volatile memory, an SAS controller (SASC) 18, a buffer management module 19 and a peripheral circuit (PFC) 20.

The front end 13 processes a command supplied from the host. That is, when a command is received from the host via the SAS controller 18 and the command is a request for reading data or a request for writing data, the command is transferred to the back end 14. Further, the CPU 15 of the front end 13 cooperates with a CPU 21 of the back end 14 to control the buffer management module 19 and the DRAM 16 functioning as a write buffer and a read buffer, and to transmit the data between the host and the DRAM 16 and between the DRAM 16 and the back end 14. This function of the front end 13 is realized by software (firmware) executed in the CPU 15.

Further, the ROM 17 stores the values of the operation management table for managing various operations of NAND memories 23 to 26, which will be described later. The values of the operation management table are read from the ROM 17 and supplied to the back end 14 to control the operations of the respective NAND memories 23 to 26.

The peripheral circuit 20 comprises a temperature sensor 20a including, for example, a thermocouple configured to detect the temperatures of, for example, the control circuit of a power supply and the substrate 11.

The back end 14 comprises, for example, the CPU 21, a flash controller 22 and the plurality of NAND memories 23 to 26. The flash controller 22 comprises a command queue 27 containing various commands supplied from the front end 13, an address translator 28 for translating a logical address into a physical address, a channel (ch) controller 29 for distributing commands and data into the NANDs 23 to 26, and a NAND controller (NANDC) 30 for controlling the operations of the NANDs 23 to 26. The NAND controller 30 comprises, for example, a command queue (q) 30a and a sequencer (seq) 30b.

The channel controller 29 supplies a command to the command queue 30a corresponding to the NANDs 23 to 26 based on an address. The NAND controller 30 converts the command in the command queue 30a into a command for the NANDs 23 to 26. The sequencer 30b controls the operations of the NANDs 23 to 26 based on the converted command.

The above-described function of the back end 14 is realized by the firmware executed in the CPU 21.

(Structure Inside NAND Package)

Figure 2:
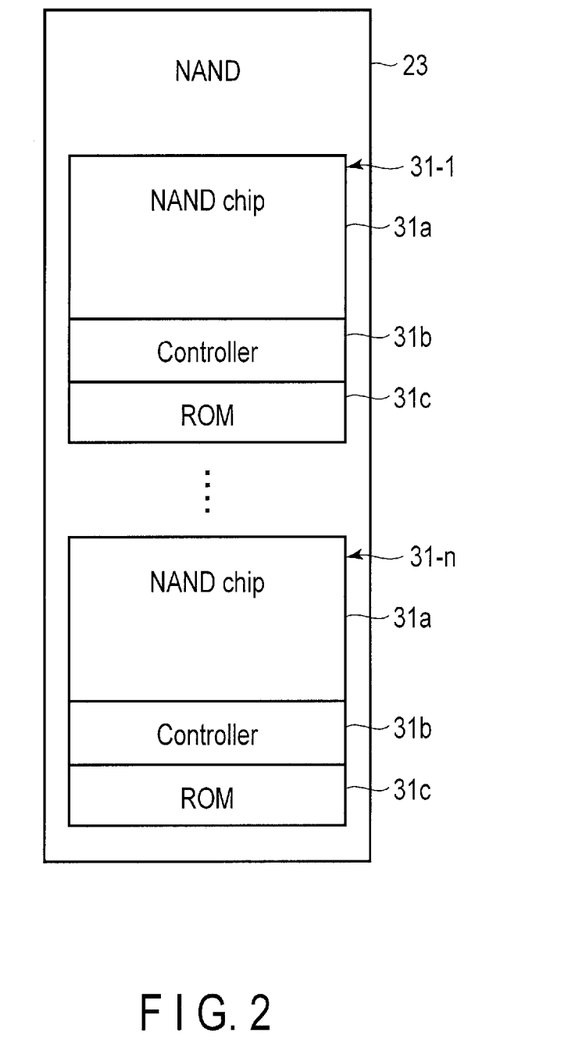
FIG. 2 is a schematic block diagram showing an example of a NAND flash memory of FIG. 1.

FIG. 2 shows an example of the NANDs 23 to 26. Since the structures of the NANDs 23 to 26 are identical to each other, only the NAND 23 will be described. The NAND 23 comprises, for example, a plurality of NAND flash memory chips (hereinafter referred to as NAND chips) 31-1 to 31-$n$. Each of the NAND chips 31-1 to 31-$n$ comprises a memory cell array 31a, a controller 31b and a writable ROM 31c. The ROM 31c may be a part of the region of the memory cell array 31a, and contains, for example, the latest operation management table, and the operation log of the corresponding NAND chip. Here, the "operation log" is the operation history of each process performed in a NAND chip. In the ROM 31c, as the NAND chip is used, the data of the operation histories corresponding to each of the parameters in the operation management table is updated as needed.

The controller 31b controls the operations of the memory cell array 31a such as writing, reading and erasing based on the command supplied from the sequencer 30a and on the values of the parameters in the operation management table.

(Operation Management Table)

Figure 3:
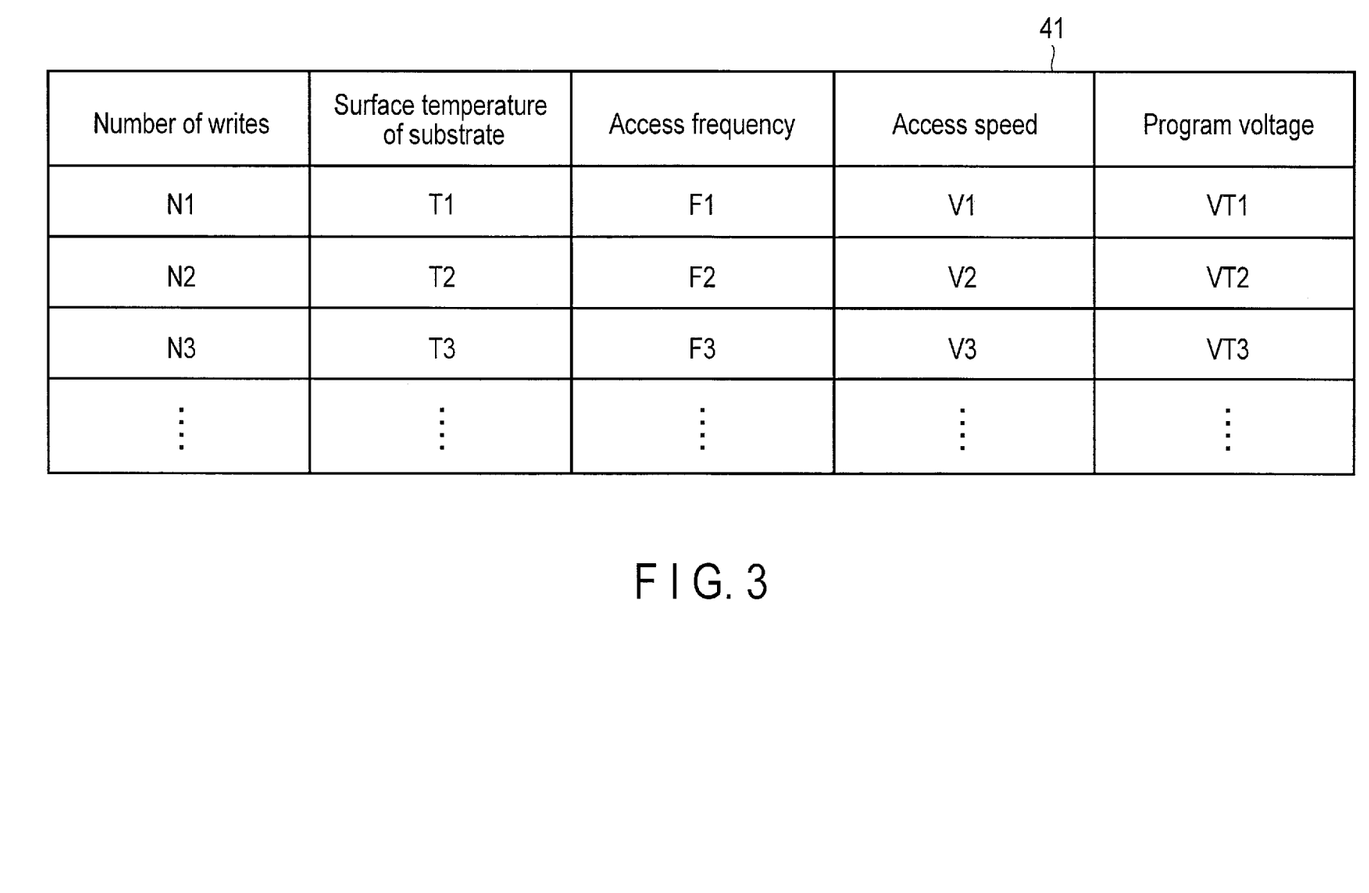
FIG. 3 is a schematic view of an example of an operation management table.

FIG. 3 shows an example of the operation management table stored in the ROM 17 of the front end 13 or in the ROM 31c of the NAND chips 31-1 to 31-$n$. The operation management table 41 manages various parameters such as the set number of writes, the set temperature of the surface of the substrate provided with the NANDs 23 to 26 (temperature detected by the temperature sensor 20a), the set access frequency, the set access speed, the set program voltage and the like, which are influential to the performance and operation of the NAND flash memory. The contents of a set of parameters of FIG. 3 are presented as an example only, and for example, the number of erases, the number of loops, the number of reads, the length of time being unattended and the like are also applicable.

Note that, here the "set" value is set as a recommended value for properly operating each NAND chip, and the SSD module 10 of the example of the present embodiment manages the operation of the NAND chip based on the respective parameters in order to prevent an improper operation of the NAND chip caused by deviation from these values, an excessive load on the NAND chip, or the like.

Further, here a specific "value" is presented as an example, but not only this but also a recommended range (upper limit and lower limit) or the like may be set as long as it can function as a parameter for properly operating each of the NAND chips.

The operation management table 41 stored in the ROM 17 of the front end 13 contains initial values required for the operations of the NANDs 23 to 26. The operation management table indicates, for example, a plurality of parameter values ($N_1$, $N_2$, ..., $T_1$, $T_2$, ..., $F_1$, $F_2$, ..., $V_1$, $V_2$, ... , $VT_1$, $VT_2$, ..., ) corresponding to a plurality of chips included in each of the NANDs 23 to 26. However, the operation management table 41 is not limited to this and may be a single operation management table commonly used for the plurality of chips provided in each of the NANDs 23 to 26.

Further, in an initial state, the ROM 31c of each of the NAND chips 31-1 to 31-$n$ stores the operation management table supplied from the ROM 17 of the front end 13, and in the operation management table, the parameter values are then updated to the latest values by an update operation, which will be described later. The NAND chips 31-1 to 31-$n$ are operated on the basis of the operation management tables stored in the respective ROMs 31c.

(Update Operation of Operation Management Table)

Figure 4:
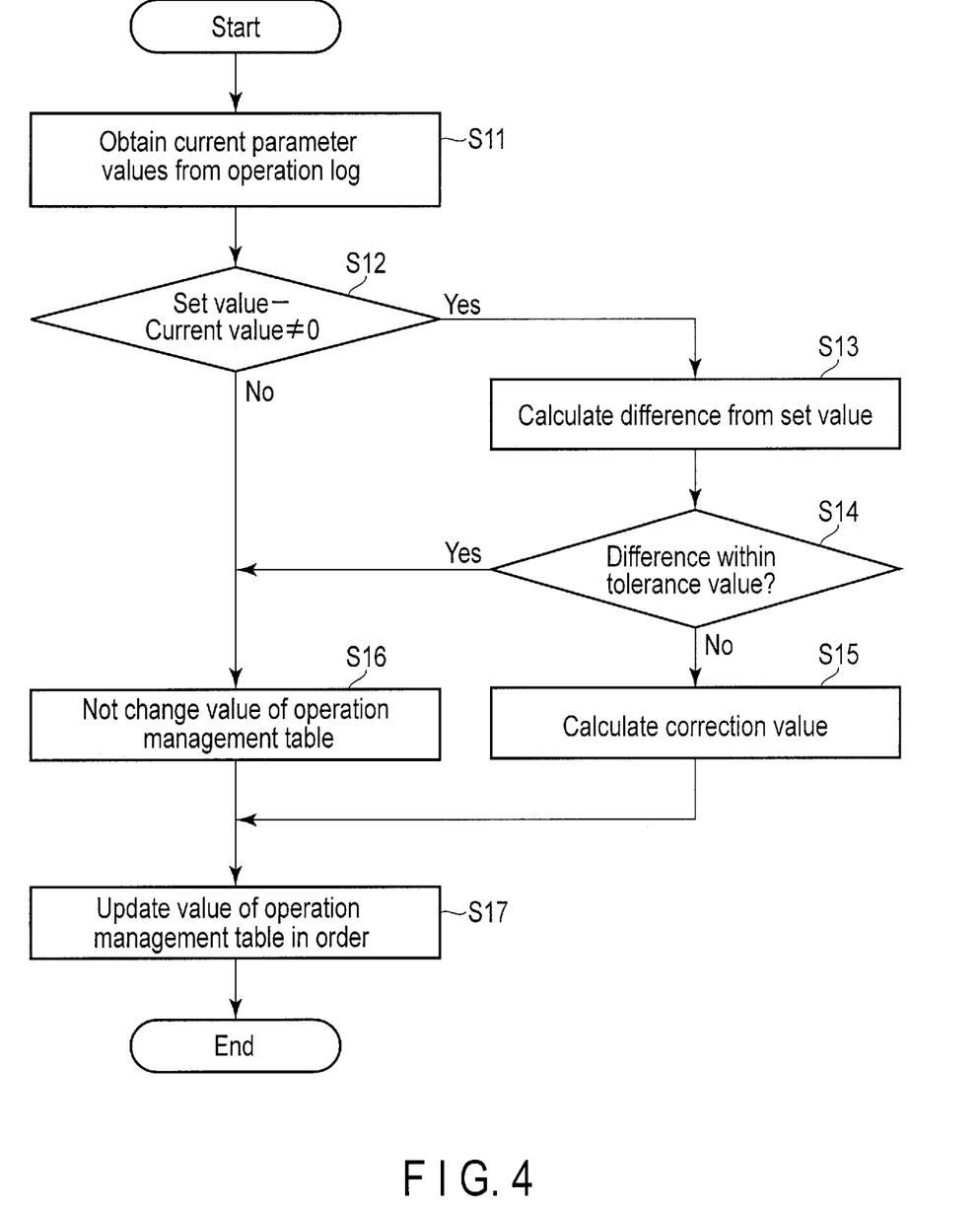
FIG. 4 is a flowchart showing an example of the operation of the first embodiment.

FIG. 4 shows an example of the update operation of the operation management table 41. The update operation can be performed by the controller 31b of each of the NAND chips 31-1 to 31-$n$ or by the CPU 21 of the back end 14. This update operation is executed when, for example, the number of writes reaches a number set in advance. Here, the following descriptions are given that the update operation is executed when the number of writes of the controller 31b of the NAND chips 31-1 to 31-$n$ reaches a set number.

In an initial state, each of the NAND chips 31-1 to 31-$n$ executes writing, reading, erasing or the like of data based on various parameter values in the operation management table 41 stored in the ROM 17 of the front end 13. When the number of writes reaches the number set in advance in the operation management table 41, values corresponding to the respective parameters of the operation management table 41 are obtained from the operation log of each of the NAND chips 31-1 to 31-$n$ (S11). That is, the controller 31b obtains from the operation log the latest values of the number of writes, the surface temperature of the substrate 11, the access frequency, the access speed, the program voltage and the like.

Then, the obtained parameter values (a present value) are compared with the parameter values (a set value) of the operation management table 41 stored in the ROM 31c, respectively (S12). As a result, when they do not coincide with each other, the difference between the obtained parameter value and the parameter value stored in the operation management table 41 is calculated for each parameter (S13).

Next, it is determined whether or not the difference calculated for each parameter is within a tolerance value, which is set in advance (S14). The tolerance value is a value which indicates that the difference does not affect operation of the NAND chip. As a result of the determination, when the difference is within a tolerance value, the parameter value of the operation management table 41 is not updated (S16) and stored in the ROM 31c of the NAND chips 31-1 to 31-$n$ (S17).

On the other hand, when the difference exceeds the tolerance value, a correction value for correcting each parameter is calculated (S15). The correction value is a value which updates the value of each parameter so that the NAND chip can be properly operated. The correction value is calculated as a value from which the difference becomes zero, for example. However, it is not limited to this. In the case of the program voltage, for example, a correction value is calculated to make the voltage, for example, higher than the current program voltage. By using a calculated correction value, each parameter value of the operation management table 41 is updated and stored in the ROM 31c of the NAND chips 31-1 to 31-$n$ (S17).

As described above, in the ROM 31c of each of the NAND chips 31-1 to 31-n, the updated operation management table 41 is stored. Then, each of the NAND chips 31-1 to 31-n is operated on the basis of the parameter values of the updated operation management table 41.

Further, the parameter values of the operation management table 41 stored in each of the NAND chips 31-1 to 31-n are then used as the set values for step 12, and the parameter values of the operation management table 41 stored in each of the NAND chips 31-1 to 31-n are updated in order.

In the above-described first embodiment, the operation log of each of the NAND chips 31-1 to 31-n is monitored, and when the parameter value (a second value) obtained from the operation log is different from the parameter value (a first value) of the operation management table 41 functioning as a set value, the difference between the obtained parameter value and the set value is calculated. Here, when the difference exceeds the tolerance value, the correction value is calculated. Based on the calculated correction value, the corresponding parameter value of the operation management table 41 is updated. Therefore, the parameter values of the operation management table 41 are set to optimum values based on the usage of the NAND memory chips 31-1 to 31-n. Consequently, it is possible to reduce the exhaustion of the NAND chips 31-1 to 31-n, and thus both the performance and the life of a device using the NAND chips 31-1 to 31-n can be sustained.

Modified Example

Figure 5:
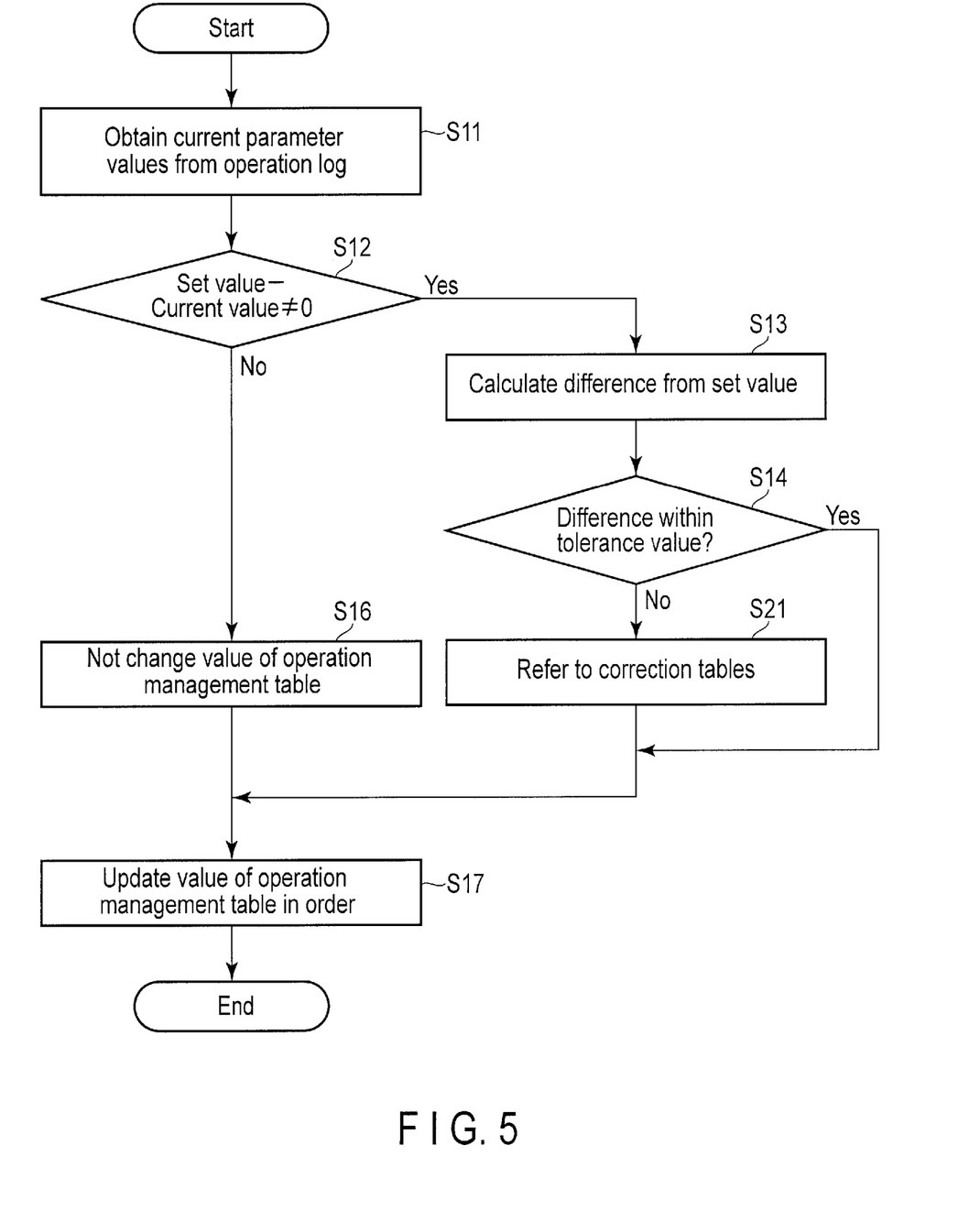
FIG. 5 is a flowchart showing a modified example of FIG. 4.

FIG. 5 shows a modified example of the first embodiment. In the example of FIG. 4, when the calculated difference exceeds the tolerance value, the correction value is obtained by calculation. In the example of FIG. 5, on the other hand, a plurality of correction value tables including different correction values corresponding to the respective parameters are prepared in advance. In this state, when it is determined in step S14 that the difference exceeds the tolerance value, one of the correction value tables is selected (S21) and the parameter values of the operation management table are updated, respectively (S17).

Also in the above-described modified example, it is possible to obtain an advantage similar to that of the first embodiment. Further, in the case of the modified example, since there is no need for calculating a correction value, it is possible to perform a high-speed operation and reduce an influence on the operation of the device on which the SSD module 10 is mounted.

Second Embodiment

Figure 6:
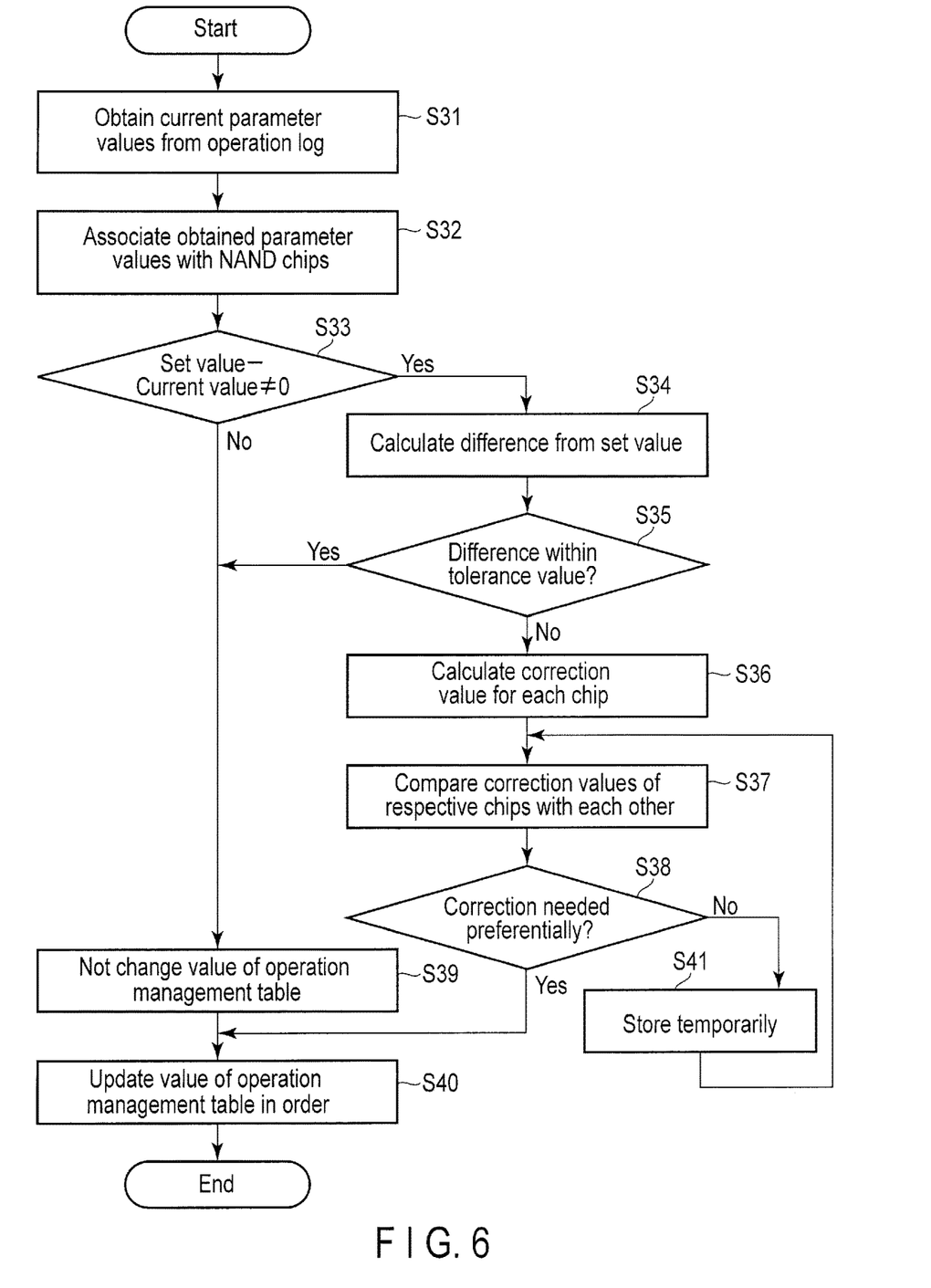
FIG. 6 is a flowchart showing an example of the operation of the second embodiment.

FIG. 6 shows the second modified example corresponding to FIG. 4. The first embodiment describes a case where the operation management table for each NAND chip is updated by the controller 31b of the NAND chips 23 to 26.

On the other hand, the second embodiment describes a case, for example, where the CPU 21 of the back end 14 manages the plurality of NAND memories 23 to 26. In this case, the ROM 17 of the front end 13 stores, for example, a single operation management table for the NANDs 23 to 26.

The operation in the above-described structure will now be described with reference to FIG. 6.

In an initial state, each of the NAND chips 31-1 to 31-n of the NANDs 23 to 26 executes writing, reading, erasing or the like of data based on various parameter values included in the operation management table 41 stored in the ROM 17 of the front end 13. For example, when the number of writes reaches a number set in advance in the operation management table 41, values corresponding to the respective values of the operation management table 41 are obtained from the operation log of each of the NAND chips 31-1 to 31-n of NAND memories 23 to 26 (S31). That is, values of the number of writes, the surface temperature of the substrate 11, the access frequency, the access speed, the program voltage and the like are obtained from the operation log.

The parameter values obtained from the operation log of each of the NAND chips 31-1 to 31-n of the NANDs 23 to 26 are supplied to the CPU 21 via the NAND controller 30. The CPU 21 associates the obtained parameter values with the NAND chips 31-1 to 31-n of the NANDs 23 to 26. That is, the obtained parameter values are managed respectively for the NAND chips 31-1 to 31-n of the NANDs 23 to 26.

Subsequently, the obtained parameter values and the parameter values contained in the operation management table 41 stored in the ROM 17 of the front end 13 are compared with each other respectively for the NAND chips 31-1 to 31-n of the NANDs 23 to 26 (S33). As a result, when they do not coincide with each other, the difference of the parameter value for each of the NAND chips 31-1 to 31-n and the parameter value of the operation management table 41 is calculated for each parameter (S34).

Next, it is determined whether the difference calculated for each parameter is within a tolerance value or not (S35). As a result, when it is within a tolerance value, the parameter value of the operation management table 41 is not updated (S39) and stored in the ROM 31c of each of the NAND chips 31-1 to 31-n of the NANDs 23 to 26 (S40).

On the other hand, when the difference exceeds the tolerance value, a correction value of each parameter value for each of the NAND chips 31-1 to 31-n is calculated (S36). The calculated correction values for the respective chips are then compared with each other to determine whether it is necessary to preferentially perform correction or not (S37 and S38). That is, for example, as the correction value of a chip becomes greater, the exhaustion degree of the chip becomes higher, and thus the correction is more preferentially needed for the chip. Further, when the correction value is small, the exhaustion degree of the NAND chip is low, and thus it is considered that there is no need to immediately perform correction.

As a result of the above-described determination, when the priority is determined to be high, the corrected operation management table 41 is stored in the corresponding ROM 31c of the NAND chips 31-1 to 31-n of the NANDs 23 to 26 (S40). Further, when the priority is determined to be low, the correction value is temporarily stored (S41) and compared with the correction value of other NAND chips again to determine whether it is necessary to perform correction preferentially or not (S37 and S38).

As described above, in the ROM 31c of each of the NAND chips 31-1 to 31-n, an updated operation management table is stored. Each of the NAND chips 31-1 to 31-n is then operated on the basis of the parameter values of the updated operation management table 41.

In the above-described second embodiment, based on the various parameter values obtained from the operation log of each of the NAND chips 31-1 to 31-n of the NANDS 23 to 26, the CPU of the back end 14 can update the parameter values of the operation management table 41 so as to recreate a new operation management table for each of the NAND chips 31-1 to 31-n corresponding to the NANDs 23 to 26. Further, the operation management tables of the respective NAND chips 31-1 to 31-n corresponding to the NANDs 23 to 26 are updated in the order of priority determined on the basis of correction values, that is, a chip of a high exhaustion degree is updated first. Therefore, it is possible to set the values of the operation management table to optimum values for each of the NAND chips 31-1 to 31-$n$. Consequently, both the performance and the life of each of the NAND chips 31-1 to 31-$n$ of the NANDs 23 to 26 can be sustained, and thus the both the performance and the life of an device on which the SSD module 10 is mounted can be sustained.

Modified Example

Figure 7:
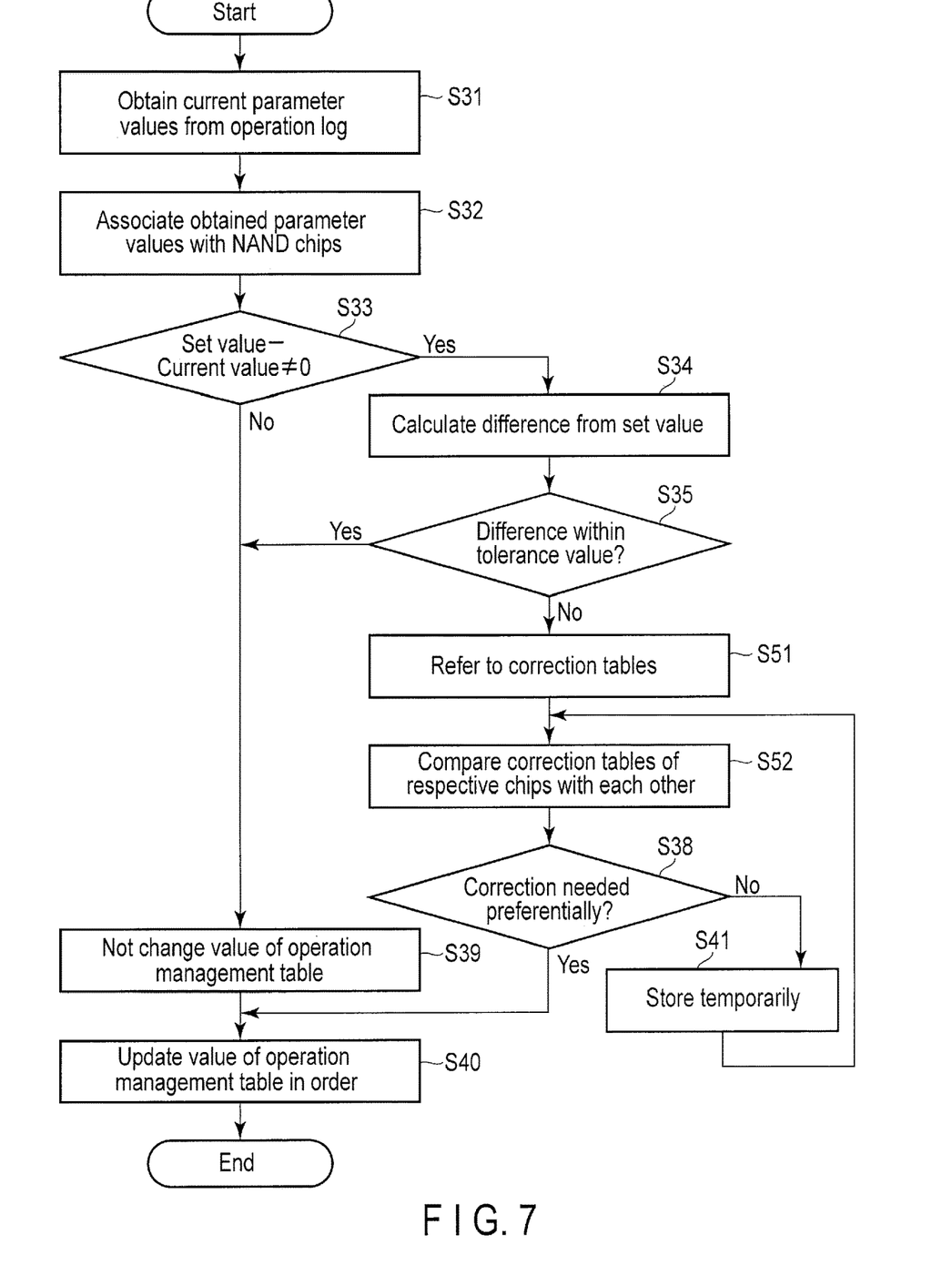
FIG. 7 is a flowchart showing a modified example of FIG. 6.

FIG. 7 shows a modified example of the second embodiment. In the example of FIG. 6, when the calculated difference exceeds the tolerance value, the correction value is obtained by calculation. On the other hand, in the example of FIG. 7, a plurality of correction tables containing different correction values corresponding to the respective NAND chips are prepared in advance. In this state, when the calculated difference exceeds the tolerance value, one of the plurality of correction value tables is selected for each NAND chip (S51). The selected correction tables for the respective NAND chips are compared with each other (S52) to determine whether the chip preferentially needs correction (S38). As a result, when it is determined that the exhaustion degree of the NAND chip is high and correction is preferentially needed, the parameter values of the operation management table 41 are corrected by the values of the correction table and stored in the ROM 31$c$ of the corresponding NAND chip (S40).

Also in the above-described modified example, it is possible to obtain an advantage similar to that of the second embodiment. Further, in the modified example, since there is no need for calculating the correction value, it is possible to perform a high-speed operation and reduce an influence on the operation of a device on which the SSD module 10 is mounted.

(Storage Array System)

Figure 8:
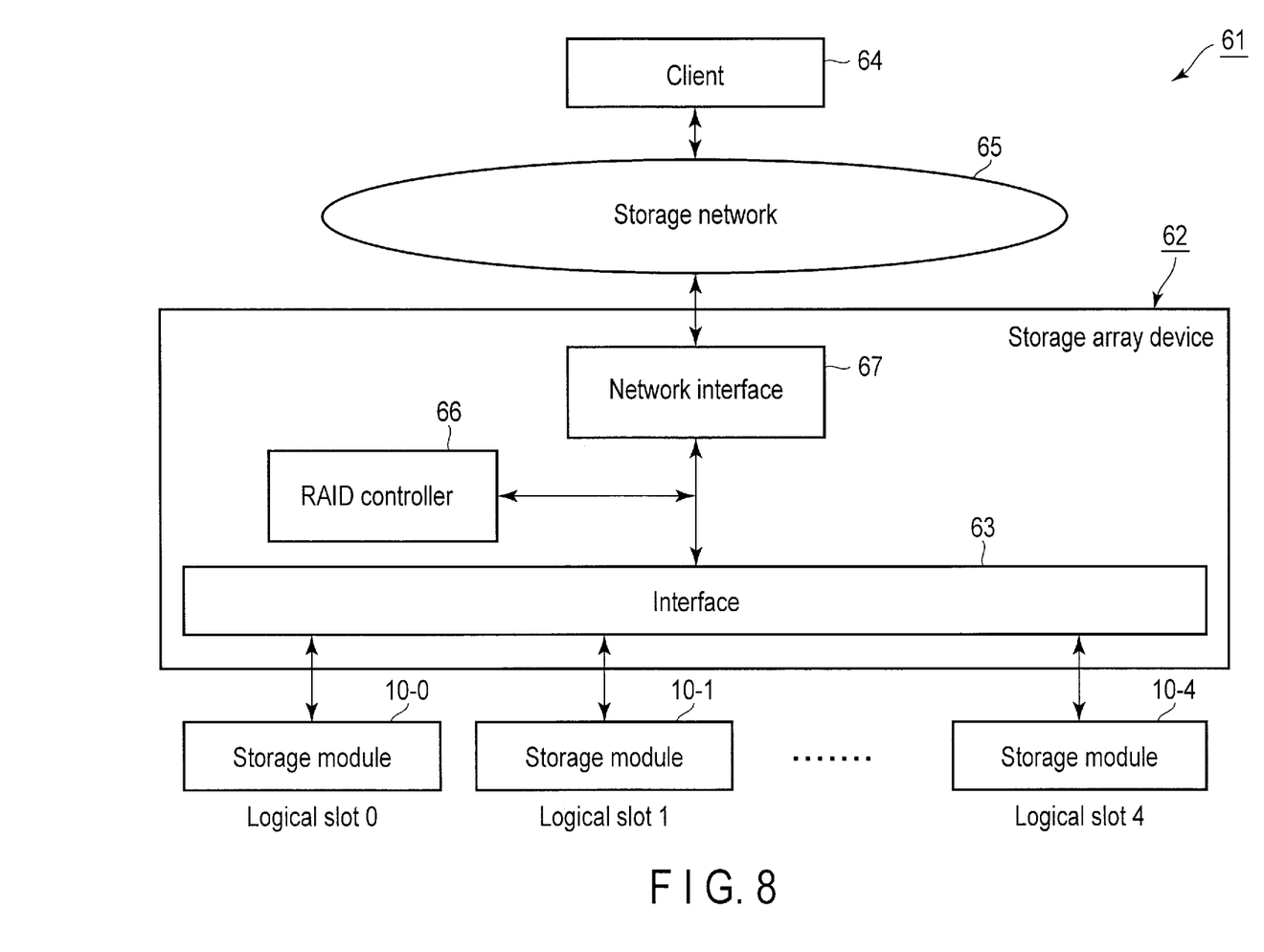
FIG. 8 is a schematic view of an example of a system to which the first and second embodiments are applied.

FIG. 8 shows an example of a storage array system 61 to which the SSD module 10 of the second embodiment is applied as a storage module. The storage array system 61 comprises a storage array device 62 as a host, and a storage network 65 configured to connect the storage array device 62 and a client 64. The storage array device 62 comprises an interface 63 configured to connect the storage array device 62 with a plurality of storage modules (SSD modules) 10-0, 10-1, . . . , 10-4 constituting a storage array, a network interface 67 configured to connect the storage array device 62 with the storage network, and a redundant arrays of inexpensive disks (RAID) controller 66.

The client 64 is, for example, a database server operated by a computer or a database management system.

The storage modules 10-0 to 10-4 are recognized as logical slots 0 to 4 respectively as logical units and by using these logical slots 0 to 4, an RAID array is constituted. FIG. 8 shows a case where the RAID array is an RAID 5, but the RAID array is not necessarily limited to the RAID 5.

To the storage network 65, for example, Fiber Channel or Ethernet is applied.

The storage array device 62 notifies to the client 64 five logical slots 0 to 4 corresponding to the storage modules 10-0 to 10-4 as one virtual logical device by the RAID 5. When a logical block address for accessing the storage array device 62 is transmitted from the client 64, the RAID controller 66 translates the logical block address into a logical slot number and a logical block address of a storage module for accessing the storage modules 10-0 to 10-4, and supplies an access command to a block specified by the logical block address which is included in at least one of the storage modules 10-0 to 10-4 specified by the logical slot number.

In the storage array system with the above-described structure, the storage modules 10-0 to 10-4 are set in such a manner as described in the first and second embodiments that the operation management table is updated on the basis of the exhaustion degree of the NAND chip to set optimum parameter values for each NAND chip. Therefore, both the performance and the life of the respective storage modules 10-0 to 10-4 are sustained. Consequently, both the performance and the life of the storage array device 62 can be sustained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a non-volatile semiconductor memory;
a first memory configured to store an operation log obtained through an operation of the non-volatile semiconductor memory, the operation log including a plurality of parameters;
a second memory configured to store a management table including a plurality of parameter sets, each of the plurality of parameter sets including a plurality of parameters for managing the non-volatile semiconductor memory; and
a controller configured to control the operation of the non-volatile semiconductor memory on the basis of a parameter of the plurality of parameters included in each of the plurality of parameter sets,
wherein the controller obtains a first parameter from a first parameter set and a second parameter from the operation log, the second parameter having a same attribute as the first parameter, and
the controller calculates a difference between a value of the first parameter and a value of the second parameter, obtains a correction value when the difference is greater than a first threshold, and updates at least one parameter having a different attribute from the attribute of the first parameter in the first parameter set on the basis of the correction value.

2. The system according to claim 1, wherein the controller obtains the correction value by calculation.

3. The system according to claim 1, wherein the controller includes a plurality of tables each including a correction value, each of the correction value included in the plurality of tables differing mutually, selects one of the tables on the basis of the difference, and updates the at least one parameter in the first parameter set on the basis of a correction value included in the selected table.

4. The system according to claim 1, wherein the first parameter and the second parameter are one of a number of writes of the non-volatile semiconductor memory, a temperature of the non-volatile semiconductor memory, and an access frequency of the non-volatile semiconductor memory.

5. The system according to claim 1, wherein the non-volatile semiconductor memory includes the first memory.

6. The system according to claim 1, wherein each of the plurality of parameter sets includes a parameter for an operation setting and a parameter for an operation environment.

7. The system according to claim 1, wherein the parameter to be updated is an operation voltage.

8. A memory system comprising:
a plurality of non-volatile semiconductor memories;
a first memory configured to store an operation log obtained through an operation of each non-volatile semiconductor memory, the operation log including a plurality of parameters;
a second memory configured to store a management table including a plurality of parameter sets, each of the plurality of parameter sets including a plurality of parameters for managing each non-volatile semiconductor memory; and
a controller configured to control the operation of each non-volatile semiconductor memory on the basis of a parameter of the plurality of parameters included in each of the plurality of parameter sets,
wherein the controller obtains a first parameter from a first parameter set for each non-volatile semiconductor memory and a second parameter from the operation log of each non-volatile semiconductor memory, the second parameter having a same attribute as the first parameter, and
the controller calculates a difference between a value of each first parameter and a value of each second parameter, obtains a correction value for each non-volatile semiconductor memory when the difference is greater than a first threshold, determines priorities by comparing each correction value, and
updates at least one parameter having a different attribute from the attribute of the first parameter in the first parameter set of the high-priority non-volatile semiconductor memory, on the basis of the correction value.

9. The system according to claim 8, wherein the controller obtains the correction value by calculation.

10. The system according to claim 8, wherein the controller includes a plurality of tables each including a correction value, each of the correction value included in the plurality of tables differing mutually, selects one of the tables on the basis of the difference, and updates the at least one parameter in the first parameter set on the basis of a correction value included in the selected table.

11. The system according to claim 8, wherein the first parameter and the second parameter are one of a number of writes of each non-volatile semiconductor memory, a temperature of each non-volatile semiconductor memory, and an access frequency of each non-volatile semiconductor memory.

12. The system according to claim 8, wherein each non-volatile semiconductor memory includes the first memory.

13. The system according to claim 8, wherein each of the plurality of parameter sets includes a parameter for an operation setting and a parameter for an operation environment.

14. The system according to claim 8, wherein the parameter to be updated is an operation voltage.

15. A memory system comprising;
a non-volatile semiconductor memory;
a memory configured to store an operation log obtained through an operation of the non-volatile semiconductor memory; and
a controller configured to control the non-volatile semiconductor memory on the basis of a first parameter and a second parameter, both the first and second parameters included in a management table, wherein
the controller updates the first parameter, on the basis of the second parameter included in the management table and a third parameter included in the operation log, the second parameter having a same attribute as the third parameter and the first parameter having a different attribute from the attribute of the second parameter.

16. The system according to claim 15, wherein the controller obtains a correction value for updating the first parameter by calculation on the basis of the second parameter and the third parameter.

17. The system according to claim 15, wherein the controller includes a plurality of tables each including a correction value, each of the correction value included in the plurality of tables differing mutually, selects one of the tables on the basis of the second parameter and the third parameter, and updates the first parameter of the management table on the basis of a correction value included in the selected table.

18. The system according to claim 15, wherein the second parameter and the third parameter are one of a number of writes of the non-volatile semiconductor memory, a temperature of the non-volatile semiconductor memory and an access frequency of the non-volatile semiconductor memory.

19. The system according to claim 15, wherein the non-volatile semiconductor memory includes the memory.

20. The system according to claim 15, wherein the first parameter is a parameter for an operation setting and the second parameter is a parameter for an operation environment.

21. The system according to claim 15, wherein the first parameter is an operation voltage.

* * * * *